United States Patent
Hatanaka

(10) Patent No.: US 10,421,616 B2
(45) Date of Patent: Sep. 24, 2019

(54) ARTICLE TRANSPORT APPARATUS AND ARTICLE TRANSPORT FACILITY

(71) Applicant: Daifuku Co., Ltd., Osaka-shi (JP)

(72) Inventor: Hideyasu Hatanaka, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/991,306

(22) Filed: May 29, 2018

(65) Prior Publication Data

US 2018/0346254 A1 Dec. 6, 2018

(30) Foreign Application Priority Data

May 30, 2017 (JP) .................................. 2017-106893

(51) Int. Cl.

| | |
|---|---|
| *B65G 29/02* | (2006.01) |
| *B65G 17/12* | (2006.01) |
| *B65G 23/08* | (2006.01) |
| *B65G 47/57* | (2006.01) |
| *F16H 7/20* | (2006.01) |
| *B65G 23/44* | (2006.01) |
| *F16H 7/08* | (2006.01) |

(52) U.S. Cl.
CPC ........... *B65G 29/02* (2013.01); *B65G 17/123* (2013.01); *B65G 23/08* (2013.01); *B65G 47/57* (2013.01); *F16H 7/20* (2013.01); *B65G 23/44* (2013.01); *F16H 2007/0865* (2013.01)

(58) Field of Classification Search
CPC ...... B65G 29/02; B65G 17/123; B65G 23/08; B65G 23/44; B65G 47/57; F16H 7/20; F16H 2007/0865

USPC ............................. 198/346, 797; 414/331.04
See application file for complete search history.

(56) References Cited

U.S. PATENT DOCUMENTS

| | | | | |
|---|---|---|---|---|
| 697,008 | A | * 4/1902 | Palmer ...................... | A47F 3/08 108/22 |
| 2,856,254 | A | * 10/1958 | Paulos ................. | A47B 63/065 312/266 |
| 3,039,606 | A | 6/1962 | Dearsley | |
| 3,343,691 | A | * 9/1967 | Anderson ............... | G06M 1/08 198/419.3 |
| 6,102,647 | A | * 8/2000 | Yap ........................ | B65G 1/127 414/467 |
| 8,713,899 | B2 | 5/2014 | Hortig et al. | |
| 9,079,725 | B2 | * 7/2015 | Galimberti ............. | B65H 29/40 |
| 2015/0037130 | A1 | 2/2015 | Galimberti | |

FOREIGN PATENT DOCUMENTS

| | | |
|---|---|---|
| DE | 102009000897 A1 | 8/2010 |
| DE | 102013104423 A1 | 10/2014 |
| DE | 102013104423 B4 | 10/2016 |
| EP | 0388686 A1 | 9/1990 |
| GB | 1252089 A | 11/1971 |

\* cited by examiner

*Primary Examiner* — William R Harp
(74) *Attorney, Agent, or Firm* — The Webb Law Firm

(57) ABSTRACT

An article transport apparatus includes a plurality of supports, a supporting rotator that rotatably supports the supports at a plurality of positions, a driving portion for rotating the supporting rotator, an attitude maintenance mechanism for keeping the plurality of supports in a constant attitude irrespective of a phase of the supporting rotator, an article carry-in portion for carrying an article into the support located at a first position, and an article carry-out portion for carrying an article out of the support located at a second position.

8 Claims, 9 Drawing Sheets

ARTICLE TRANSPORT APPARATUS AND ARTICLE TRANSPORT FACILITY

CROSS-REFERENCE TO RELATED APPLICATION

This application claims priority to Japanese Patent Application No. 2017-106893 filed May 30, 2017, the disclosure of which is hereby incorporated in its entirety by reference.

FIELD OF THE INVENTION

The present invention relates to an article transport apparatus and an article transport facility.

BACKGROUND

Article transport apparatuses for transporting articles are used in picking stations in which articles are picked, for example. The specification of U.S. Pat. No. 8,713,899 (Patent Document 1) discloses an article transport apparatus (container-handling mechanism 22) for picking provided with a raising/lowering mechanism (elevator assembly 26). The article transport apparatus disclosed in Patent Document 1 is configured such that a product storage container (container T) supplied to a lower portion of the apparatus is raised to an upper portion of the apparatus using the raising/lowering mechanism, required products are picked at a position to which the product storage container is raised, and a remaining product storage container is then carried out through an article carry-out portion (extractor mechanism 32).

However, with the article transport apparatus disclosed in Patent Document 1, once the product storage container is raised using the raising/lowering mechanism, the next product storage container cannot be received until the raising/lowering mechanism is lowered again after picking is performed and the product storage container is carried out. Therefore, there is a drawback in that transport efficiency is poor. Moreover, while the raising/lowering mechanism is raised or lowered, the delivery portion (extractor assembly 32) of the article carry-out portion must be withdrawn from the picking position (pick area 23) in a timely manner so as not to interfere with the raising/lowering mechanism, and thus the apparatus configuration is complicated in terms of both structure and control.

A rotary bucket-type article transport apparatus as disclosed in German Patent No. 102013104423 (Patent Document 2) is also known. However, in the article transport apparatus disclosed in Patent Document 2, a plurality of supports (Zinkenaufnahmen 16) are each rotatably supported by two supporting rotators (Rotoren 14) that are eccentrically arranged in a state in which the rotation axes of the supports are shifted from one another. Therefore, there is a drawback in that the supports are likely to rattle, and have poor durability.

SUMMARY OF THE INVENTION

There is demand for the realization of an article transport apparatus that has a simple apparatus configuration in terms of both structure and control, has good transport efficiency, and has good durability.

An article transport apparatus according to the present disclosure includes:
a plurality of supports for supporting an article;
a supporting rotator that can be rotated about a single main shaft and rotatably supports the supports at a plurality of positions located at an equal distance from the main shaft in a radial direction and arranged at equal intervals in a circumferential direction;
a driving portion for rotating the supporting rotator;
an attitude maintenance mechanism for keeping the plurality of supports in a constant attitude irrespective of a phase of the supporting rotator;
an article carry-in portion for carrying an article into the support located at a first position in the circumferential direction; and
an article carry-out portion for carrying an article out of the support located at a second position separate from the first position in the circumferential direction.

With this configuration, the positions in the circumferential direction of the plurality of supports supported by the supporting rotator can be changed simply by the driving portion rotating the supporting rotator, and the articles supported by the supports can be thus transported. Therefore, compared with an article transport apparatus provided with a raising/lowering mechanism, for example, the structure can be simplified, and easy control can be achieved. Moreover, an article can be carried into a support from the article carry-in portion at the first position and an article can be carried into the article carry-out portion from a support at the second position with the rotation of the same supporting rotator, thus making it possible to improve the transport efficiency. The plurality of supports are supported by a pair of supporting rotators that are rotated about the single main shaft, and each of the supports can be rotated about a single subshaft. Therefore, the supports are less likely to rattle, and have good durability. An article transport apparatus can be thus achieved that has a simple apparatus configuration in terms of both structure and control, has good transport efficiency, and has good durability.

Further features and advantages of the present disclosure will become apparent from the following description of illustrative and non-limiting embodiments with reference to the drawings.

DETAILED DESCRIPTION

An embodiment of an article transport apparatus and an embodiment of an article transport facility will be described with reference to the drawings. These embodiments will be described using an article transport apparatus 1 incorporated in a picking facility and an article transport facility 100 as examples. The picking facility is used to collect, based on a picking order that specifies the type and the number of products G to be shipped, a specified number of a specific type of product G stored in a storage container C and taken out of an automatic warehouse in this state, and place the products G in a shipment container C. The article transport apparatus 1 and the article transport facility 100 are used to transport the containers C (i.e., empty containers or containers in which products G are stored, including storage containers Cs and shipment containers Co) as articles.

Figure 1:
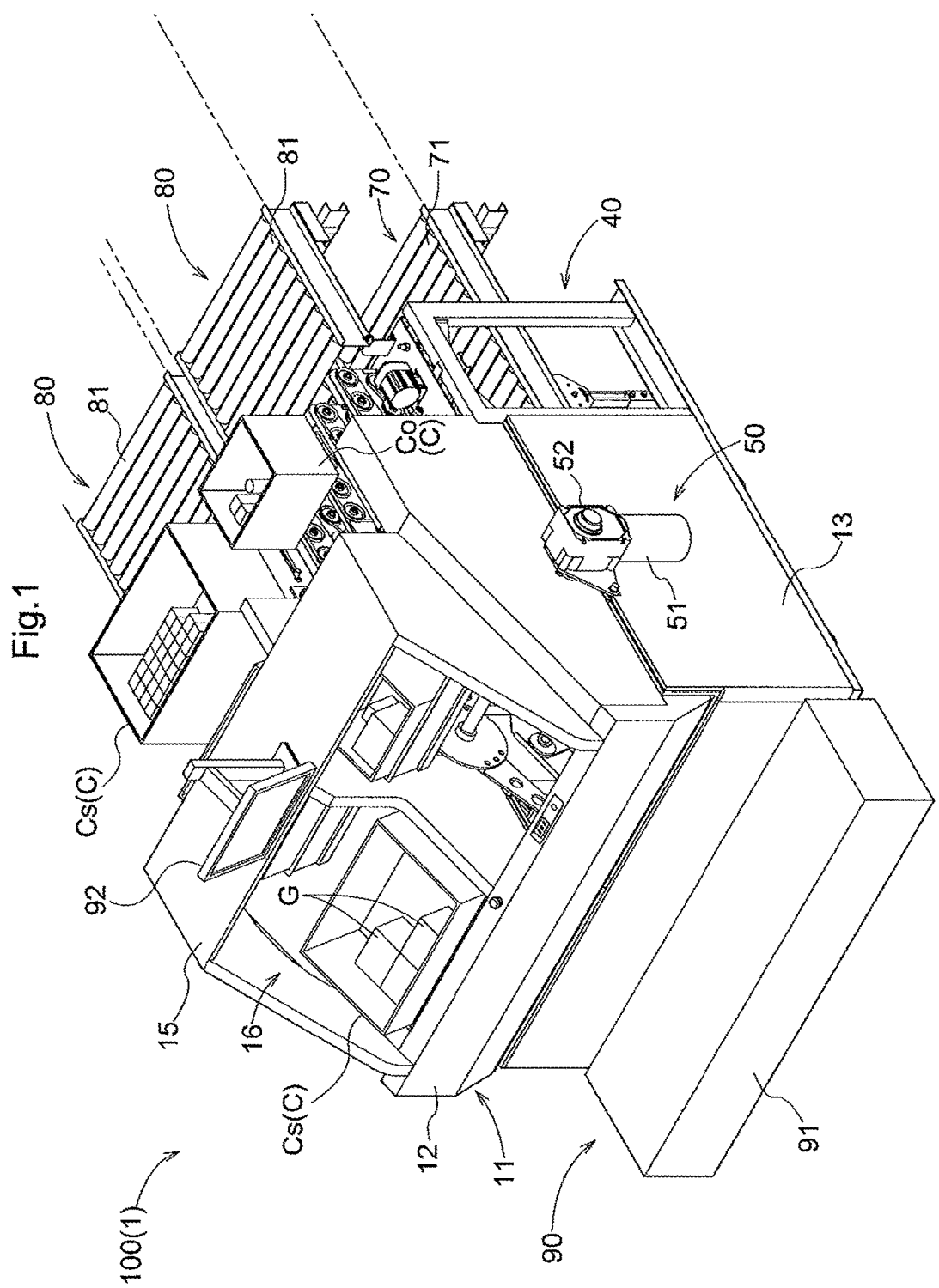
FIG. 1 is a perspective view showing an external appearance and structure of an article transport facility of an embodiment.
Figure 2:
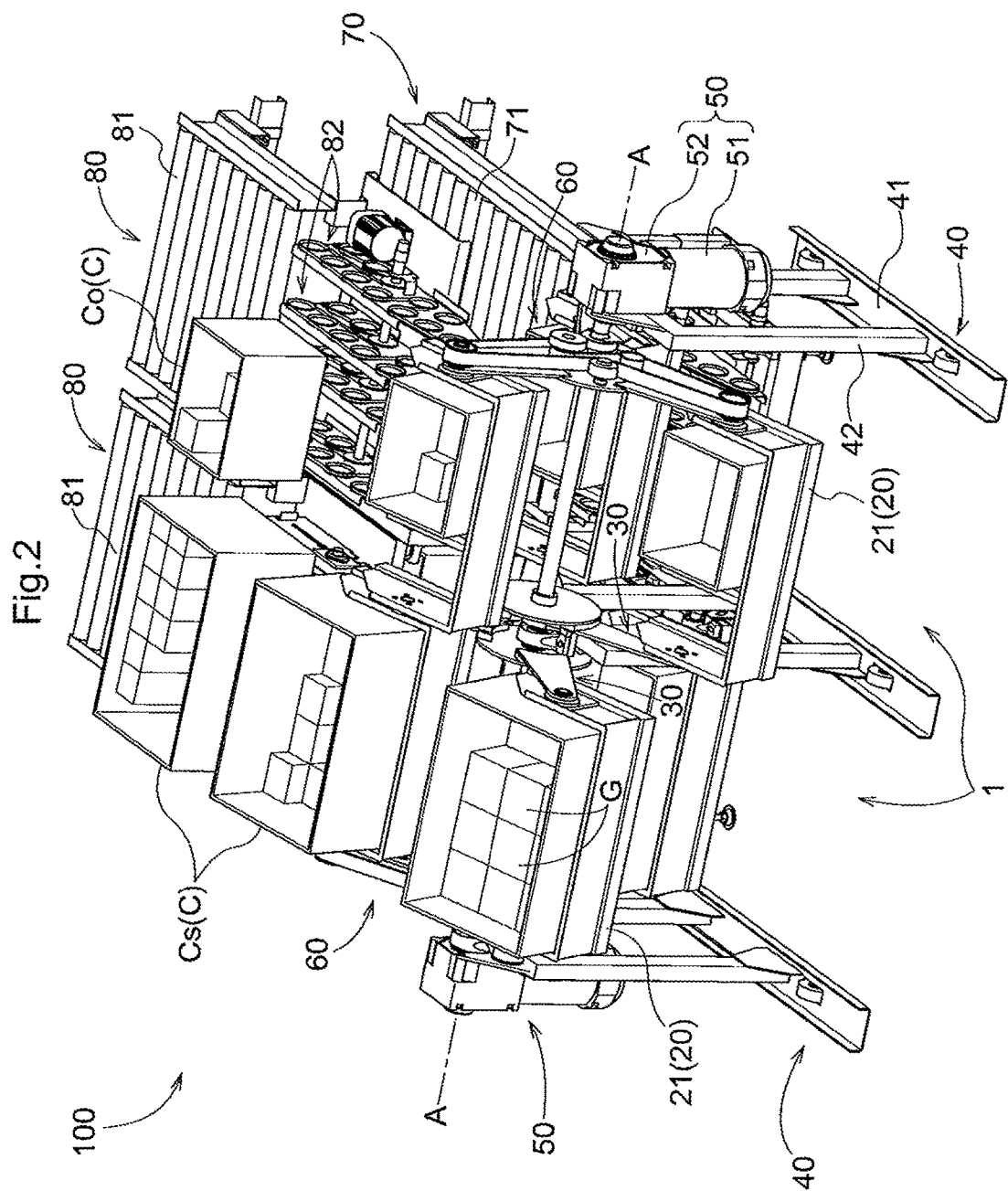
FIG. 2 is a perspective view showing an internal structure of the article transport facility.

As shown in FIGS. 1 and 2, the article transport facility 100 includes two article transport apparatuses 1, and the article transport apparatuses 1 are arranged side-by-side. A first article transport apparatus 1 transports the storage containers Cs, and a second article transport apparatus 1 transports the shipment containers Co. The article transport apparatuses 1 each include a plurality of supports 20, a supporting rotator 30, a base 40, a driving portion 50, an attitude maintenance mechanism 60, an article carry-in portion 70, an article carry-out portion 80, and an article handling portion 90. The supports 20, the supporting rotator 30, the base 40, and the attitude maintenance mechanism 60 are accommodated in a frame case 11. The driving portion 50 and the article handling portion 90 are provided outside the frame case 11. The article carry-in portion 70 and the article carry-out portion 80 are arranged extending from the exterior side of the frame case 11 to the interior side of the frame case 11. A cover 15 is attached to the frame case 11 so as to cover an upper opening. An operator can access the containers C supported by the supports 20 through an opening 16 in the cover 15.

Figure 3:
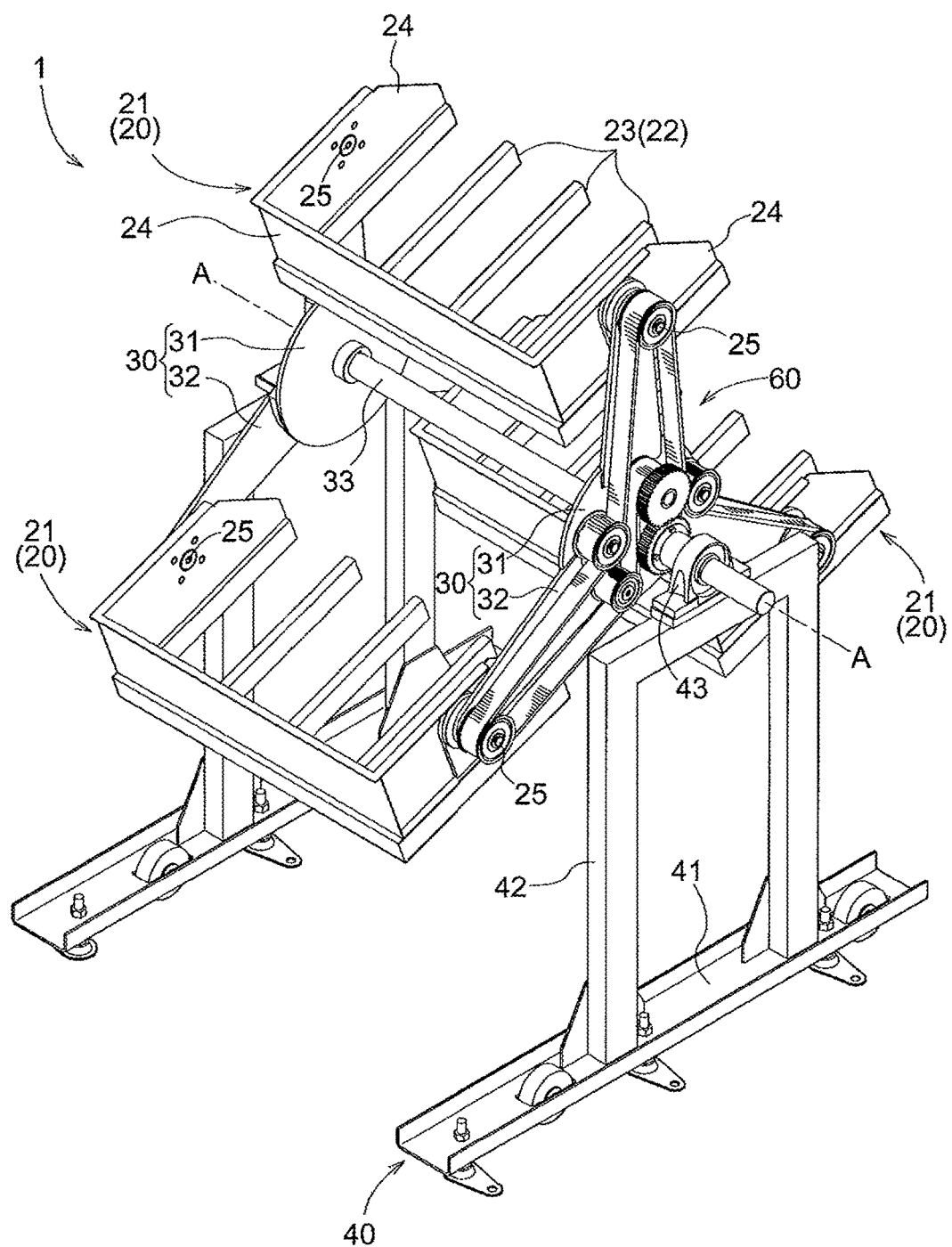
FIG. 3 is a perspective view showing the structure of a relevant portion of an article transport apparatus.

As shown in FIG. 3, the article transport apparatus 1 includes a plurality of (three in this embodiment) supports 20. Each support 20 supports the container C from below, and is constituted by a basket-like body (bucket) 21 in which one end is open. Each support 20 includes a bottom portion 22 having a rectangular shape as a whole in a plan view, and a lateral wall portion 24 provided surrounding three sides of the bottom portion 22. The bottom portion 22 has a comb-like shape. The bottom portion 22 is constituted by a plurality of comb teeth 23 that are arranged at predetermined intervals in an axial direction (referred to merely as "axial direction" hereinafter) of a main shaft A that is a rotation axis of the supporting rotator 30, which will be described later. The lateral wall portion 24 includes a portion (back plate portion) that is provided standing upright on a portion of the bottom portion 22 that couples the ends of the comb teeth 23 on a side opposite to an open end 23*a*. In addition, the lateral wall portion 24 includes portions (a pair of lateral plate portions) that are bent to extend from both ends of the back plate portion in parallel with the comb teeth 23 and face each other. The lateral wall portion 24 has a U shape (square U shape) in a plan view. A rotation shaft 25 is fixed to each of the two lateral plate portions of the lateral wall portion 24. Each support 20 is rotatably (axially rotatably) supported at the rotation shafts 25 on both sides by the supporting rotator 30.

The supporting rotator 30 rotatably supports the supports 20 at a plurality of (three in this embodiment) positions, and is provided to be capable of being rotated about the single main shaft A. The positions at which the supports 20 are supported on the supporting rotator 30 are set to be located at an equal distance from the main shaft A in the radial direction and are arranged at equal intervals in the circumferential direction. The supporting rotator 30 includes circular central plate portions 31 that intersect the main shaft A at a right angle, and a plurality of (three in this embodiment) arm portions 32 that radially extend from each of the central plate portions 31 at positions equally spaced apart from each other in the circumferential direction. Portions near the leading ends of the arm portions 32 in the supporting rotator 30 rotatably support a corresponding support 20. It should be noted that the supporting rotator 30 includes two units that each include the central plate portion 31 and the arm portions 32, and supports the supports 20 from both sides in the axial direction. A coupling shaft 33 arranged extending in the axial direction couples the central portions of the two central plate portions 31 such that the central plate portions 31 are rotated together. The coupling shaft 33 passes through the two central plate portions 31 and extends toward the outside therefrom.

The base 40 rotatably supports the supporting rotator 30. The base 40 is formed by assembling frame bars, and includes base portions 41 and two supporting frame bodies 42 that are provided standing upright on the base portions 41. The two supporting frame bodies 42 are arranged so as to be located on the outside in the axial direction with respect to the two central plate portions 31. Bearing portions 43 are fixed to the upper surfaces of the supporting frame bodies 42. The bearing portions 43 support the ends of the coupling shaft 33 on the outside with respect to the two central plate portions 31. In this embodiment, the base 40 corresponds to a "non-rotating member".

The driving portion 50 rotates the supporting rotator 30. As shown in FIGS. 1 and 2, the driving portion 50 includes, as a main component, a driving motor 51 acting as a driving force source. The driving portion 50 further includes a transmission 52 for varying (e.g., reducing) the rotation speed of the driving motor 51 and transferring the varied rotation to the coupling shaft 33. However, the transmission 52 need not be provided, and a configuration in which the rotation of the driving motor 51 is transferred to the coupling shaft 33 directly (i.e., in a state in which the rotation speed is maintained) is also possible. The driving portion 50 is configured to perform an intermittent action such that a rotation of the supporting rotator 30 and a temporary suspension are repeated. In this case, the supporting rotator 30 is configured to be temporarily suspended in a specific phase and be continuously rotated in the other phase.

In this specification, the specific phase refers to a phase (rotational position) in which one of the three supports 20 supported by the supporting rotator 30 faces the downstream end of the article carry-in portion 70, another one faces the upstream end of the article carry-out portion 80, and the remaining one faces the article handling portion 90 (specifically, the opening 16 in the cover 15, for example; see FIG. 1). In the configuration in which the three supports 20 are supported at equal intervals in the circumferential direction as in this embodiment, the specific phase becomes available every 120° (=360°/3) rotation, and in this case, the driving portion 50 repeats the 120° rotation and subsequent temporary suspension.

The article transport apparatus 1 of this embodiment is of a rotary type, and therefore, when a plurality of supports 20 are fixed to and supported by the supporting rotator 30, the attitudes of the supports 20 are inverted with the rotation of the supporting rotator 30, and the containers C (and the products G) thus fall down. To address this, the article transport apparatus 1 is provided with the attitude maintenance mechanism 60 for keeping the supports 20 in a constant attitude irrespective of the phase of the supporting rotator 30. The attitude maintenance mechanism 60 keeps the supports 20 in a constant attitude with respect to the base 40 acting as a non-rotating member (in other words, with respect to the vertical direction). The attitude maintenance mechanism 60 conveys the rotation of the supporting rotator 30 outward, and keeps the supports 20 in a constant attitude by using the conveyed rotation as a rotation source to actively rotate (axially rotate) the supports 20 in a direction opposite to the rotational direction of the supporting rotator 30. It should be noted that "constant attitude" means that the orientation and the inclination are always constant as viewed from the outside of the article transport apparatus 1.

Figure 4:
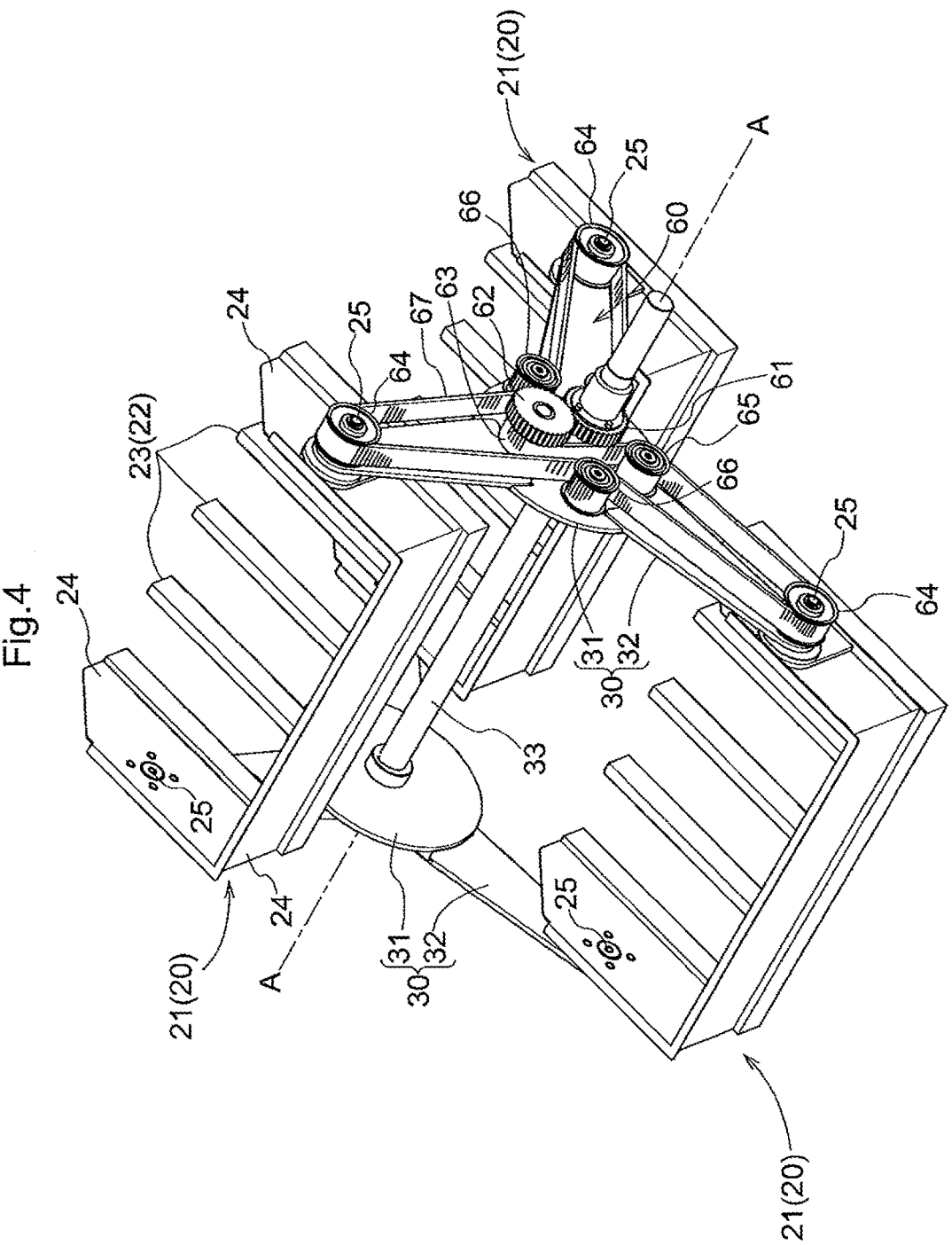
FIG. 4 is a perspective view of an attitude maintenance mechanism.
Figure 5:
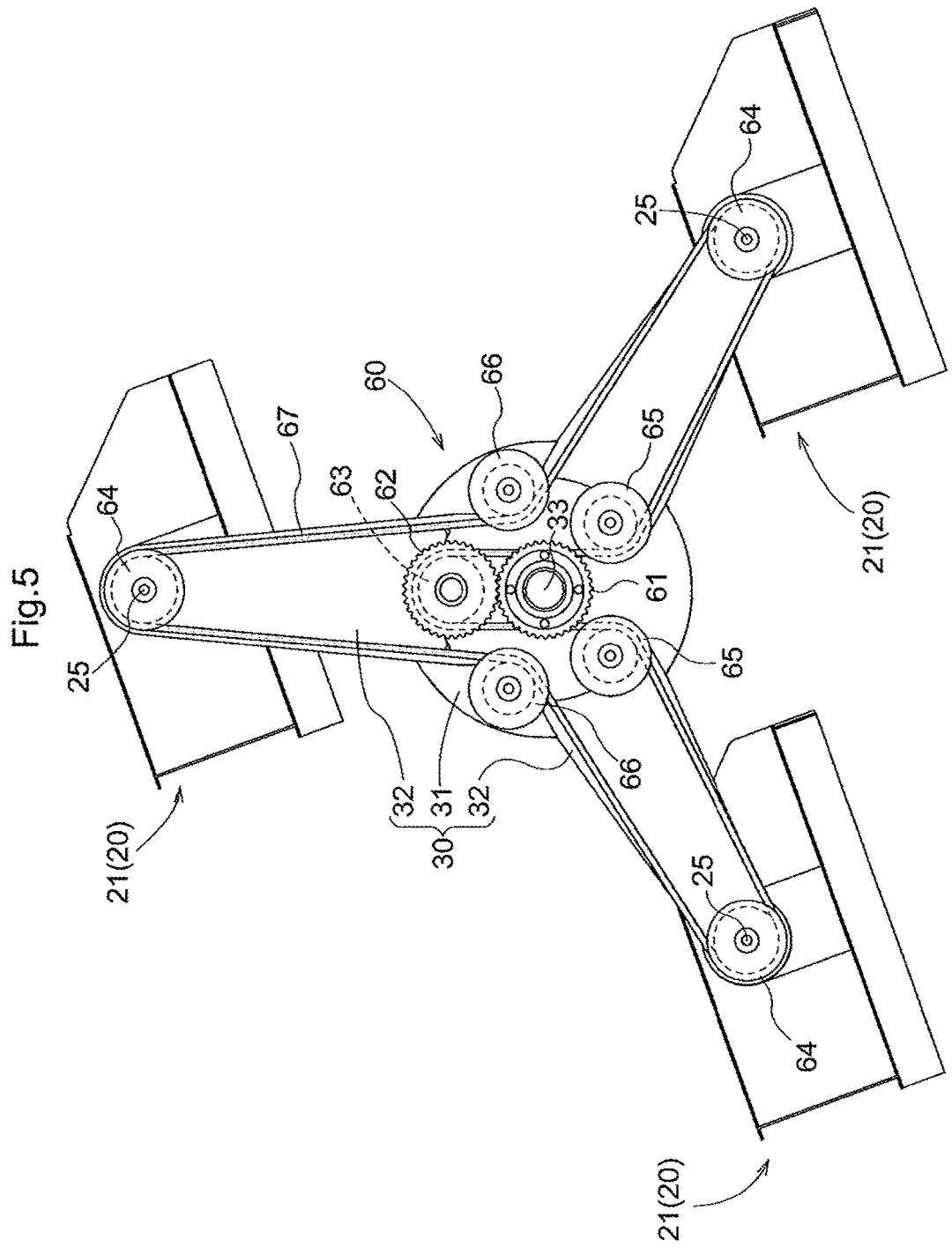
FIG. 5 is a front view of the attitude maintenance mechanism.

As shown in FIGS. 4 and 5, the attitude maintenance mechanism 60 includes a fixed gear 61, a movable gear 62, a driving pulley 63, driven pulleys 64, first idling pulleys 65, second idling pulleys 66, and a transmission belt 67. The fixed gear 61 is fixed to the base 40 and is concentric with the main shaft A. The fixed gear 61 is fixed to a portion near the central plate portion 31 of the supporting rotator 30 in the bearing portion 43 fixed to the upper surface of the supporting frame body 42 included in the base 40, via a tubular coupling member, for example. A central hole extending in the axial direction is formed in the fixed gear 61, and the coupling shaft 33 of the supporting rotator 30 is arranged passing through this central hole. As described above, the fixed gear 61 is separate from the supporting rotator 30, and even when the supporting rotator 30 is rotated, the fixed gear 61 fixed to the base 40, which is a non-rotating member, does not rotate.

The movable gear 62 is rotatably supported by the supporting rotator 30 (specifically, the central plate portion 31). Therefore, the movable gear 62 can be rotated (revolved) with the rotation of the supporting rotator 30 as viewed from outside, and can be rotated (axially rotated) with respect to the supporting rotator 30. The movable gear 62 is supported by a portion of the central plate portion 31 that is offset, in the radial direction, from the position of the main shaft A so as to mesh with the fixed gear 61 fixed to the base 40. The position at which the movable gear 62 is supported in the circumferential direction is the same as the position of one of the arm portions 32 in the circumferential direction. The position at which the movable gear 62 is supported is located near the basal portion of the arm portion 32. The number of teeth of the movable gear 62 is set to be the same as the number of teeth of the fixed gear 61. Therefore, when the supporting rotator 30 is rotated, the movable gear 62 meshing with the fixed gear 61 is axially rotated at an angle that is the same as the rotational angle of the supporting rotator 30 in a direction that is the same as the rotational direction of the supporting rotator 30.

The driving pulley 63 is coupled to the movable gear 62 so as to be axially rotated together with the movable gear 62. The driving pulley 63 is concentric with the movable gear 62 and is fixed to a surface on the central plate portion 31 side of the movable gear 62. When the supporting rotator 30 is rotated, the driving pulley 63, which is integrally coupled to the movable gear 62, is axially rotated at an angle that is the same as the rotational angle of the supporting rotator 30 in a direction that is the same as the rotational direction of the supporting rotator 30. The driving pulley 63 of this embodiment is provided with protrusions and recesses on the outer circumferential surface (i.e., protrusions and recesses that are alternately arranged in the circumferential direction). In this embodiment, the driving pulley 63 corresponds to a "driving member".

Three driven pulleys 64 are provided corresponding to the supports 20. The driven pulleys 64 are axially rotatably supported by the supporting rotator 30 (specifically, portions near the leading ends of the arm portions 32). The outer diameters of the driven pulleys 64 are set to be the same as the outer diameter of the driving pulley 63. The driven pulleys 64 are coupled to the rotation shafts 25 of the corresponding supports 20. When the driven pulleys 64 are rotated (axially rotated), the corresponding supports 20 are also rotated (axially rotated) together with the driven pulleys 64. The driven pulleys 64 of this embodiment are provided with protrusions and recesses on the outer circumferential surface (i.e., protrusions and recesses that are alternately arranged in the circumferential direction). In this embodiment, the driven pulleys 64 correspond to "driven members".

Two idling pulleys 65 and two idling pulleys 66 are provided. The idling pulleys 65 and 66 are axially rotatably supported by the supporting rotator 30 (specifically, the central plate portion 31). The first idling pulleys 65 are supported at positions located near the basal portions of the remaining two arm portions 32 other than the arm portion 32 whose position in the circumferential direction is the same as the position of the movable gear 62 in the circumferential direction. The second idling pulleys 66 are supported at positions in the circumferential direction that are located between the arm portion 32 whose position in the circumferential direction is the same as the position of the movable gear 62 in the circumferential direction and the remaining two arm portions 32. The idling pulleys 65 and 66 of this embodiment are provided with protrusions and recesses on the outer circumferential surfaces (i.e., protrusions and recesses that are alternately arranged in the circumferential direction).

The transmission belt 67 is wound around the driving pulley 63 and the driven pulleys 64. The transmission belt 67 is also wound around the first idling pulleys 65 and the second idling pulleys 66. The transmission belt 67 of this embodiment is provided with protrusions and recesses on both surfaces (i.e., protrusions and recesses that are alternately arranged in the extension direction). The transmission belt 67 is wound such that one surface is in contact with the driven pulleys 64 and the first idling pulleys 65 and the other surface is in contact with the driving pulley 63 and the second idling pulleys 66. The transmission belt 67 is wound around the driving pulley 63 and the driven pulleys 64 and turned by the idling pulleys 65 and 66, and is thus arranged to extend substantially along the shapes of the arm portions 32. The idling pulleys 65 and 66 also have a function of providing tension to the transmission belt 67. In this embodiment, the transmission belt 67 corresponds to a "drive transmission member".

It should be noted that, in this embodiment, the transmission belt 67 turned by the first idling pulleys 65 is wound around the driving pulley 63 on a side opposite to the first idling pulleys 65 with respect to the main shaft A (coupling shaft 33). As a result, the actual range in which the driving pulley 63 and the transmission belt 67 engage with each other is wide (in the embodiment shown in FIG. 5, they engage with each other in a range of a central angle of 180° in the driving pulley 63), and therefore, the transmission belt 67 is less likely to jump. If the transmission belt 67 is worn away, the transmission belt 67 can be replaced from the outside of the main shaft A (without removing the driving shaft), and good maintainability is thus achieved.

Figure 6:
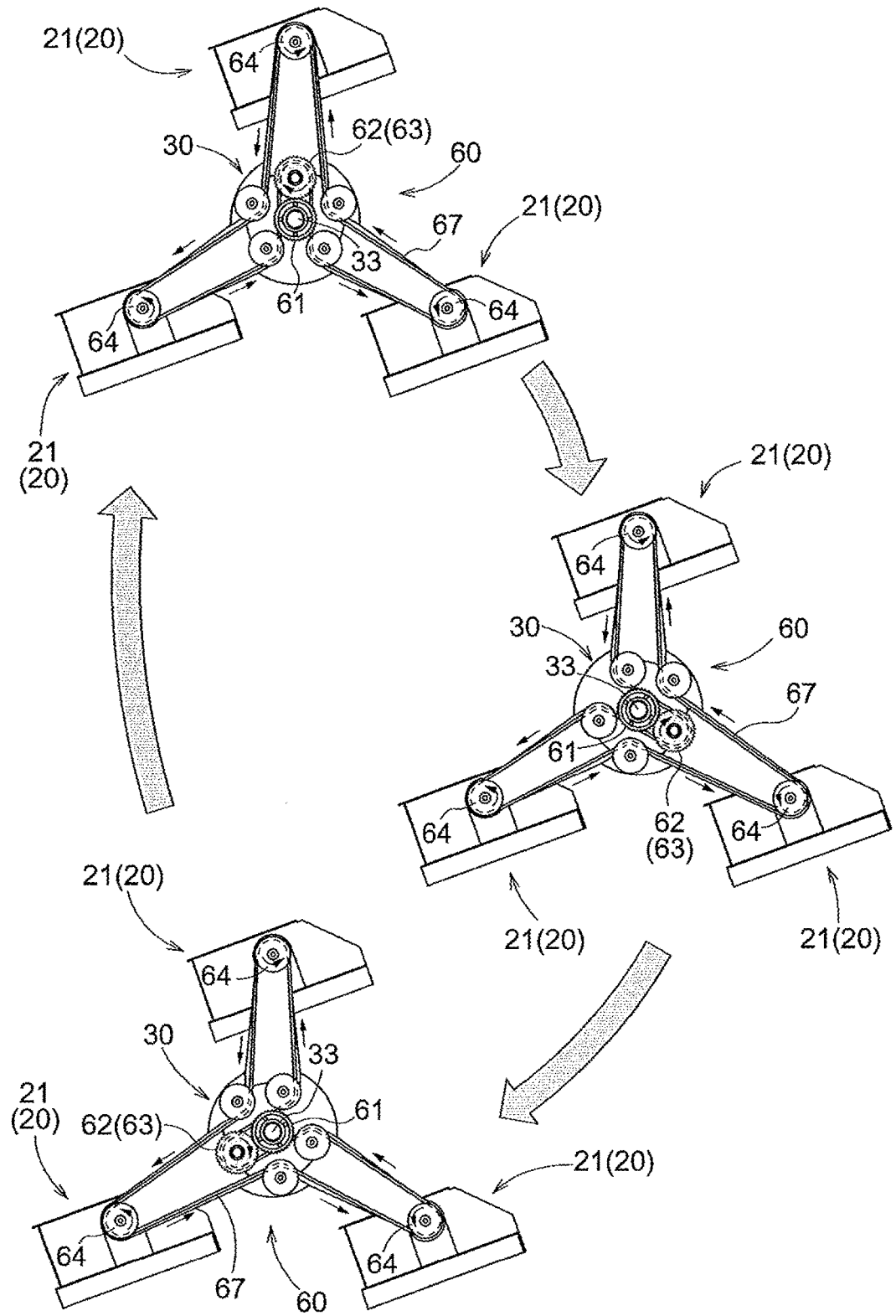
FIG. 6 is a schematic view showing the movement of the attitude maintenance mechanism.

As described above, when the supporting rotator 30 is rotated, the movable gear 62 and the driving pulley 63, which is integrally coupled to the movable gear 62, are axially rotated at an angle that is the same as the rotational angle of the supporting rotator 30 in a direction that is the same as the rotational direction of the supporting rotator 30. Then, the driven pulleys 64 are axially rotated in a direction opposite to the rotational direction of the supporting rotator 30 via the transmission belt 67 wound around the driving pulley 63. At this time, since the outer diameter of the driving pulley 63 is set to be the same as the outer diameters of the driven pulleys 64, the supports 20, which are integrally coupled to the driven pulleys 64, are axially rotated at an angle that is the same as the rotational angle of the supporting rotator 30 in a direction opposite to the rotational direction of the supporting rotator 30. The attitude maintenance mechanism 60 thus keeps the supports 20 in a constant attitude irrespective of the phase of the supporting rotator 30 as shown in FIG. 6.

It should be noted that friction-type fastening elements (e.g., "Power Lock (registered trademark)" manufactured by Tsubakimoto Chain Co.) can be used to couple the driven pulleys 64 to the rotation shafts 25 of the corresponding supports 20. This makes it easy to adjust the attitudes (inclinations to the horizontal direction) of the supports 20, and their attitudes can be thus maintained by the attitude maintenance mechanism 60. The attitudes of the supports 20 can be set as appropriate considering the efficiency of the picking operation, which will be described later. The inclinations of the supports 20 to the horizontal direction may be set to 1° to 45°, for example, and the inclination is preferably set to 10° to 15° in this range. It will be appreciated that the supports 20 may be kept in a horizontal attitude without being inclined.

When the two article transport apparatuses 1 are provided side-by-side as in this embodiment, it is preferable that, in each of the article transport apparatus 1, the driving portion 50 and the attitude maintenance mechanism 60 are provided on a side opposite to the other article transport apparatus 1 in a direction in which the article transport apparatuses 1 are lined up. In addition, it is preferable that the article transport apparatuses 1 share one of the two supporting frame bodies 42 included in the base 40 (i.e., the supporting frame body 42 located on the other article transport apparatus 1 side in a direction in which the article transport apparatuses 1 are lined up).

Figure 7:
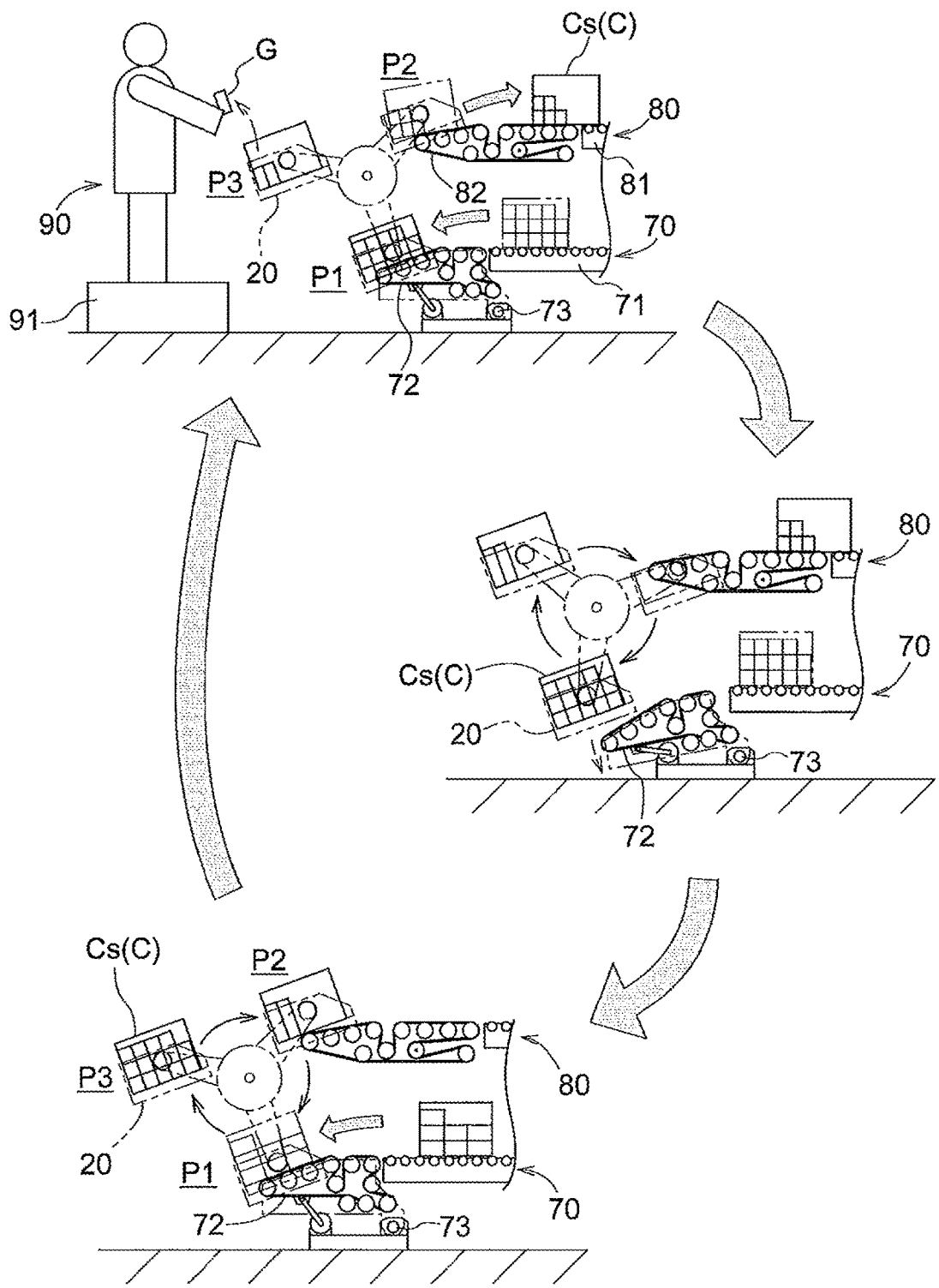
FIG. 7 is a schematic view showing the movement of the article transport apparatus.

As shown in FIG. 7, three set positions, namely a first position P1, a second position P2, and a third position P3, are specified in the rotation locus of the supports 20 that are rotated when the supporting rotator 30 is rotated. The first position P1, the second position P2, and the third position P3 are provided to be located at equal intervals in the circumferential direction (at a central angle of 120°) and to correspond to the positions at which the three supports 20 are arranged when the supporting rotator 30 is in a specific phase. The first position P1, the third position P3, and the second position P2 are arranged in this order from the upstream side toward the downstream side in the rotational direction of the supporting rotator 30.

In this embodiment, as shown in FIG. 7, the second position P2 and the second position P3 are arranged at substantially the same position in the vertical direction, and the first position P1 is arranged below the second position P2 and the third position P3. The first position P1 and the second position P2 are arranged at substantially the same position in the horizontal direction, and the third position P3 is arranged at a position located near a front plate 12 (see FIG. 1) of the frame case 11 with respect to the first position P1 and the second position P2.

The article carry-in portion 70 carries a container C into the support 20 located at the first position P1. As shown in FIGS. 2 and 7, the article carry-in portion 70 includes a carry-in conveyor 71 extending from an automatic warehouse (not shown), and a delivery conveyor 72 provided at a position that is located at the downstream end of the carry-in conveyor 71 and at which the container C is delivered to the support 20 located at the first position P1. The carry-in conveyor 71 can be formed as a roller conveyor, a belt conveyor, a chain conveyor, or the like. The delivery conveyor 72 can be formed as a plurality of rows of belt conveyors that are separately provided at a plurality of positions in the axial direction of the main shaft A. Each of these plurality of rows of belt conveyors can be considered as a "comb tooth", and in this respect, the delivery conveyor 72 is formed in a comb-like shape.

The rows included in the delivery conveyor 72 are arranged at positions corresponding to a plurality of gaps between the comb teeth 23 of the bottom portion 22 of the support 20 in the axial direction. The belt conveyors included in the delivery conveyor 72 and the comb teeth 23 of the bottom portion 22 of the support 20 are arranged alternately in the axial direction. As a result, while the overall support 20 and the overall delivery conveyor 72 are provided in the same region in the axial direction, the arrangement positions of the comb teeth 23 of the support 20 are shifted relative to the arrangement positions of the rows included in the delivery conveyor 72. Therefore, when the supporting rotator 30 is rotated, the support 20 does not interfere with the delivery conveyor 72. In this embodiment, the delivery conveyor 72 corresponds to a "delivery portion" of the article carry-in portion 70.

The delivery conveyor 72 is installed so as to be gradually inclined downward from the end on the carry-in conveyor 71 side toward the end on the support 20 side in a stationary state. The delivery conveyor 72 is installed so as to be inclined at an angle that is substantially the same as the inclination angle of the bottom portion 22 of the support 20. The delivery conveyor 72 is configured to be capable of being tilted downward from the stationary state using a tilting shaft 73 provided near the boundary with the carry-in conveyor 71 as a fulcrum. When the supporting rotator 30 is rotated after the container C has been carried in from the article carry-in portion 70 and transferred to the support 20, the container C supported by the support 20 interferes with the delivery conveyor 72. Inclining the delivery conveyor 72 downward temporarily (see the middle diagram in FIG. 7) makes it possible to avoid such interference and move the container C smoothly with the rotation of the supporting rotator 30. After the container C has passed, the delivery conveyor 72 is returned to the stationary state again.

The article carry-out portion 80 is arranged above the article carry-in portion 70. In this embodiment, the article carry-out portion 80 is arranged to overlap the article carry-in portion 70 in a plan view. The article carry-out portion 80 carries the container C out of the support 20 located at the second position P2. The article carry-out portion 80 includes a carry-out conveyor 81 extending to the automatic warehouse (not shown), and a receiving conveyor 82 provided at a position that is located at the upstream end of the carry-out conveyor 81 and at which the container C is delivered from the support 20 located at the second position P2. The carry-out conveyor 81 can be formed as a roller conveyor, a belt conveyor, a chain conveyor, or the like as in the carry-in conveyor 71. Similarly to the delivery conveyor 72, the receiving conveyor 82 can be formed as a plurality of rows of belt conveyors that are separately provided at a plurality of positions in the axial direction of the main shaft A. Each of these plurality of rows of belt conveyors can be considered as a "comb tooth", and in this respect, the receiving conveyor 82 is also formed in a comb-like shape.

The rows included in the receiving conveyor 82 are arranged at positions corresponding to a plurality of gaps between the comb teeth 23 of the bottom portion 22 of the support 20 in the axial direction. The belt conveyors included in the receiving conveyor 82 and the comb teeth 23 of the bottom portion 22 of the support 20 are arranged alternately in the axial direction. As a result, while the overall support 20 and the overall receiving conveyor 82 are provided in the same region in the axial direction, the arrangement positions of the comb teeth 23 of the support 20 are shifted relative to the arrangement positions of the rows included in the receiving conveyor 82. Therefore, when the supporting rotator 30 is rotated, the support 20 does not interfere with the receiving conveyor 82. In this embodiment, the receiving conveyor 82 corresponds to a "delivery portion" of the article carry-out portion 80.

The receiving conveyor 82 is also installed so as to be gradually inclined downward from the end on the carry-out conveyor 81 side toward the end on the support 20 side. The receiving conveyor 82 is installed so as to be inclined at an angle that is smaller than the inclination angles of the bottom portion 22 of the support 20 and the delivery conveyor 72. Since the receiving conveyor 82 is installed in a slightly inclined state, the container C can make a soft landing on the receiving conveyor 82 when the container C is automatically transferred to the receiving conveyor 82 with the rotation of the supporting rotator 30 (see the lower diagram in FIG. 7).

The article handling portion 90 is a portion at which the handling of the container C supported by the support 20 located at the third position P3 is performed. When the container C is the storage container Cs, for example, the "handling of the container C" means the removal of the products G from the storage container Cs, and when the container C is the shipment container Co, the "handling of the container C" means the loading of the products G to the shipment container Co. When one of the two article transport apparatuses 1 provided side-by-side transports the storage containers Cs and the other transports the shipment containers Co as in this embodiment, the products G removed from the storage container Cs can be loaded into the shipment container Co in the article handling portion 90. Such a picking operation may be performed by an operator or automated using a robot arm or the like.

In this embodiment, the operator manually performs the picking operation. As shown in FIG. 1, the article handling portion 90 is provided with a working platform 91 and a monitor 92. The working platform 91 is a platform on which the operator who performs the picking operation stands, and is configured such that its height can be adjusted by raising/lowering the top plate. A picking order that specifies the type and the number of products G to be shipped is displayed on the monitor 92. The monitor 92 can be constituted by a touch panel, for example. When the operator touches a placement completion button displayed on the monitor 92 (touch panel) after removing the required number of products G from the storage container Cs, the supporting rotator 30 is merely rotated 120°, so that the next storage container Cs in which another type of product G is stored can be supplied to the article handling portion 90.

In the article transport facility 100 of this embodiment, the operation of carrying a storage container Cs into a support 20 from the article carry-in portion 70 at the first position P1, the picking operation at the third position P3, and the operation of carrying a storage container Cs into the article carry-out portion 80 from a support 20 at the second position P2 can be performed simultaneously (see the upper diagram in FIG. 7). Specifically, in the specific phase in which the supports 20 are located at the positions P1 to P3, the picking operation is performed on a storage container Cs supported by a support 20 located at the third position P3, and at the same time, a storage container Cs is carried into a support 20 located at the first position P1 from the article carry-in portion 70, and a storage container Cs is carried into the article carry-out portion 80 from a support 20 located at the second position P2.

When the monitor 92 (touch panel) is operated through a touch operation after the operation of picking the specified type of product G is complete, the delivery conveyor 72 in the article carry-in portion 70 is tilted downward. In this state, the supporting rotator 30 is rotated 120°, and then stopped. Thereafter, the next storage container Cs in which another type of product G is stored is supplied to the article handling portion 90, and the operation of picking this type of product G can be performed. At the same time, the storage container Cs in which the products G remaining after the picking operation in the previous step are stored is delivered to the receiving conveyor 82 in the article carry-out portion 80, and is then carried out. The support 20 located at the first position P1 is empty, and the next storage container Cs is carried thereinto from the article carry-in portion 70.

Repeating these operations successively makes it possible to remove the required number of a plurality of types of products G and load them into a shipment container Co in a mixed state. When the loading of the products G to be shipped to a specific destination is complete, it is sufficient that the supporting rotator 30 in the article transport apparatus 1 for shipment containers Co is rotated 120°, a loaded shipment container Co is carried out through the article carry-out portion 80, and the next shipment container Co is carried in through the article carry-in portion 70.

OTHER EMBODIMENTS (1) In the above-mentioned embodiment, the configuration in which the article carry-in portion 70 is arranged below the article carry-out portion 80 is described as an example. However, there is no limitation to such a configuration, and the article carry-out portion 80 may also be arranged below the article carry-in portion 70, for example. In this case, it is sufficient that the supporting rotator 30 is rotated in a direction opposite to the rotational direction in the above-mentioned embodiment. In this configuration, it is preferable that the receiving conveyor 82 in the article carry-out portion 80 located on the lower side is configured to be capable of being tilted downward.

(2) In the above-mentioned embodiment, the configuration in which the bottom portion 22 of the basket-like body 21 constituting the support 20 is formed in a comb-like shape is described as an example. However, there is no limitation to such a configuration, and the bottom portion 22 of the basket-like body 21 may also be formed in a flat plate shape, for example. In this case, it is preferable that both the delivery conveyor 72 in the article carry-in portion 70 and the receiving conveyor 82 in the article carry-out portion 80 are configured to be capable of being tilted or sliding so as to avoid interference with the support 20 when the supporting rotator 30 is rotated.

Figure 8:
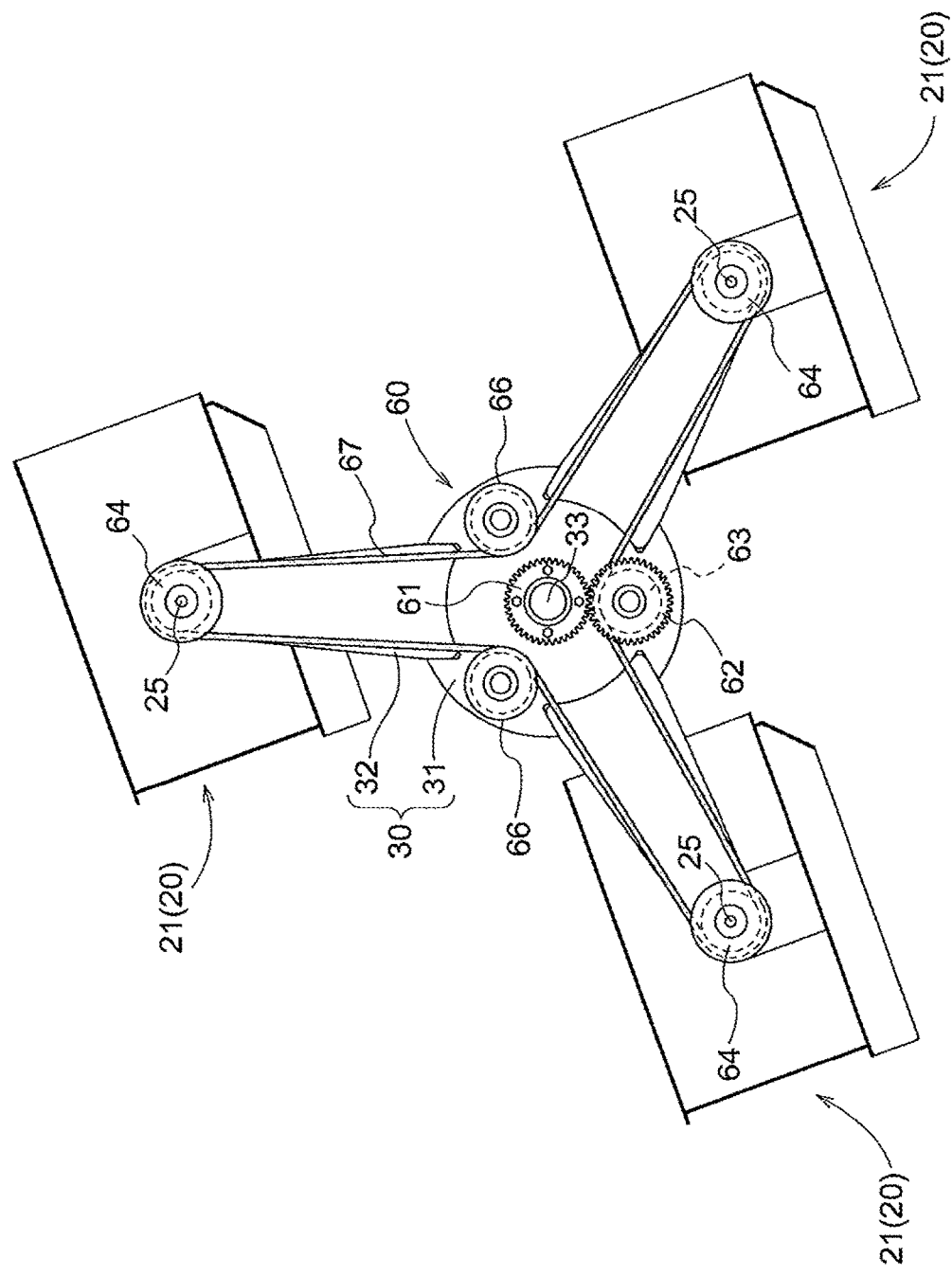
FIG. 8 is a front view of another aspect of the attitude maintenance mechanism.

(3) In the above-mentioned embodiment, the configuration in which the attitude maintenance mechanism 60 includes the first idling pulleys 65 with which one surface of the wound transmission belt 67 is in contact, and the second idling pulleys 66 with which the other surface of the wound transmission belt 67 is in contact is described as an example. However, there is no limitation to such a configuration, and the attitude maintenance mechanism 60 may also include idling pulleys corresponding to only the second idling pulleys 66 in the above-mentioned embodiment as shown in FIG. 8, for example. In this case, positions at which the movable gear 62 and the driving pulley 63 are supported are located between two arm portions 32 in the circumferential direction, and six elements in total, namely the driving pulley 63, the two second idling pulleys 66, and the three arm portions 32 are arranged in a dispersed manner (preferably at equal intervals) in the circumferential direction.

(4) In the above-mentioned embodiment, the configuration in which the attitude maintenance mechanism 60 includes the driving pulley 63 rotated together with the movable gear 62 meshing with the fixed gear 61, the driven pulleys 64, and the transmission belt 67 wound therearound is described as an example. However, there is no limitation to such a configuration, and the attitude maintenance mechanism 60 may also include a driving sprocket rotated together with the movable gear 62 meshing with the fixed gear 61, a driven sprocket, and a transmission chain wound therearound, for example. In this case, the driving sprocket corresponds to the "driving member", the driven sprocket corresponds to the "driven member" and the transmission chain corresponds to the "drive transmission member". An attitude maintenance mechanism 60 having any structure, such as a mechanism utilizing gravity, may also be used as long as the supports 20 can be kept in a constant attitude irrespective of the phase of the supporting rotator 30.

(5) In the above-mentioned embodiment, the configuration in which the number of teeth of the fixed gear 61 is set to be the same as the number of teeth of the movable gear 62, and the outer diameter of the driving pulley 63 is set to be the same as the outer diameters of the driven pulleys 64 is described as an example. However, there is no limitation to such a configuration, and the number of teeth of the gears 61 and 62 and the outer diameters of the pulleys 63 and 64 can be set as appropriate under a limited condition that the product of the gear ratio (ratio of the number of teeth of the movable gear 62 to the number of teeth of the fixed gear 61) and the pulley ratio (ratio of the outer diameter of the driven pulley 64 to the outer diameter of the driving pulley 63) is "1".

Figure 9:
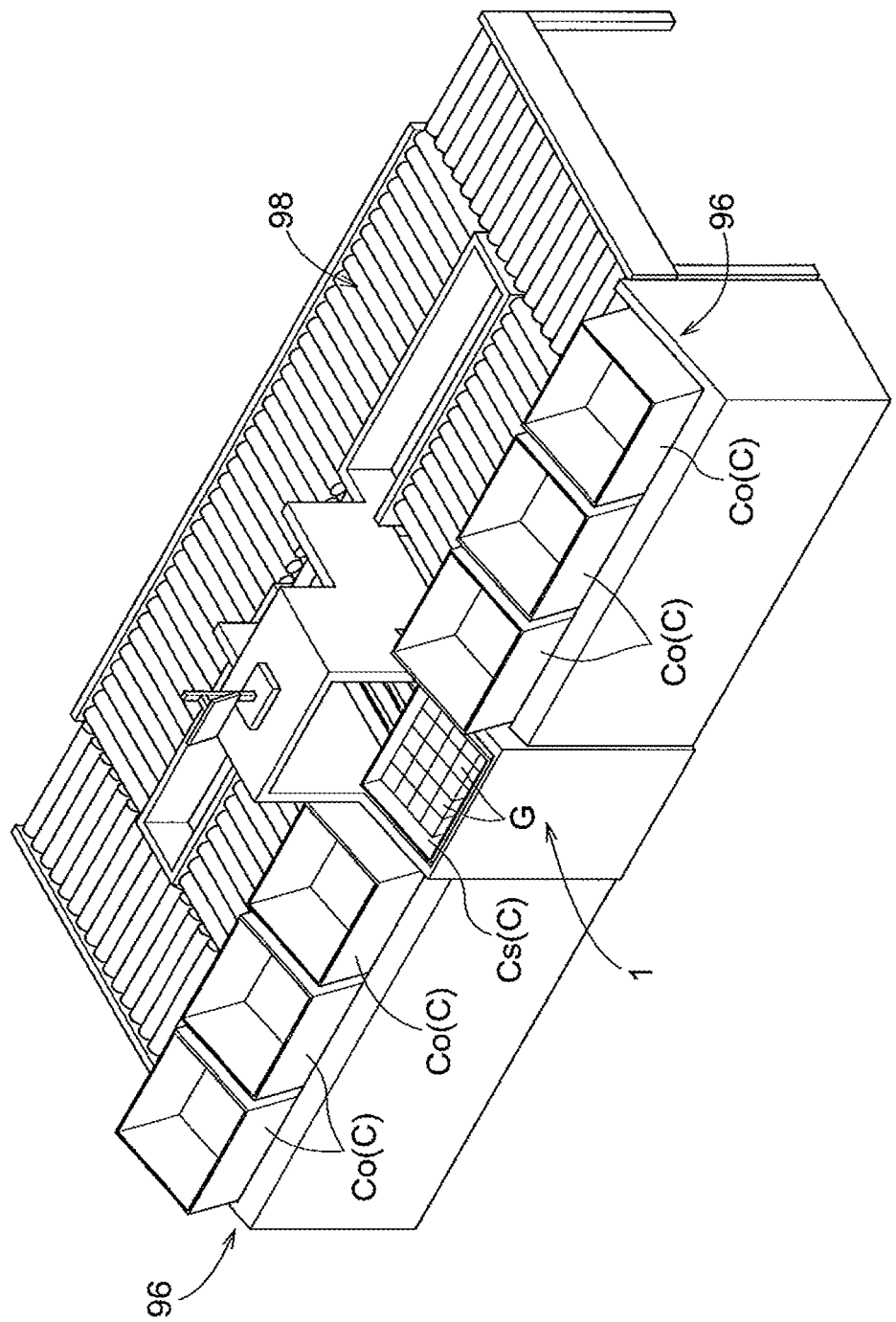
FIG. 9 is a perspective view showing an external appearance and structure of another aspect of the article transport facility.

(6) In the above-mentioned embodiment, a single picking system in which the picking operation is performed to load the products G into a single shipment container Co is assumed and described. However, there is no limitation to such a configuration, and as shown in FIG. 9, for example, the article transport apparatus 1 of this embodiment can be applied to a multi picking system in which the picking operation can be performed to simultaneously load the products G into a plurality of shipment containers Co. In such a multi picking system, shipment container supporting portions 96 for supporting the shipment containers Co are provided on both sides of the article transport apparatus 1. The products G are removed from the storage container Cs transported by the article transport apparatus 1, and the required number of the products G are loaded into each of a plurality of shipment containers Co supported by the shipment container supporting portions 96. The loaded shipment containers Co are placed on the shipment conveyor 98 automatically or manually by an operator and then transported to a shipment station. It should be noted that a single picking system and a multi picking system may also be used together in a picking facility.

(7) In the above-mentioned embodiment, a configuration in which the operation of carrying a storage container Cs into a support 20 from the article carry-in portion 70 at the first position P1, the picking operation at the third position P3, and the operation of carrying a storage container Cs into the article carry-out portion 80 from a support 20 at the second position P2 are performed is described as an example. However, there is no limitation to such a configuration, and the article transport apparatus 1 may be merely a rotational transfer apparatus that repeats only the operation of carrying the storage container Cs into a support 20 from the article carry-in portion 70 at the first position P1 and the operation of carrying a storage container Cs from the support 20 into the article carry-out portion 80 at the second position P2. Alternatively, a configuration is also possible in which four supports 20 are provided and another step such as reading of the types (e.g., bar codes or IC tags) of products is performed at a fourth position.

(8) The configurations disclosed in the above-described embodiments (including the above-mentioned embodiment and other embodiments; the same applies hereinafter) can also be used in combination with configurations disclosed in other embodiments as long as they are compatible with each other. Regarding the other configurations, the embodiments disclosed herein are illustrative in all respects and can be modified as appropriate without departing from the gist of the present disclosure.

Summary of Embodiments

To summarize the description above, the article transport apparatus according to the present disclosure preferably includes the following configurations.

The article transport apparatus according to the present disclosure is an article transport apparatus including:

a plurality of supports for supporting an article;

a supporting rotator that can be rotated about a single main shaft and rotatably supports the supports at a plurality of positions located at an equal distance from the main shaft in a radial direction and arranged at equal intervals in a circumferential direction;

a driving portion for rotating the supporting rotator;

an attitude maintenance mechanism for keeping the plurality of supports in a constant attitude irrespective of a phase of the supporting rotator;

an article carry-in portion for carrying an article into the support located at a first position in the circumferential direction; and an article carry-out portion for carrying an article out of the support located at a second position separate from the first position in the circumferential direction.

With this configuration, the positions in the circumferential direction of the plurality of supports supported by the supporting rotator can be changed simply by the driving portion rotating the supporting rotator, and the articles supported by the supports can be thus transported. Therefore, compared with an article transport apparatus provided with a raising/lowering mechanism, for example, the structure can be simplified, and easy control can be achieved. Moreover, an article can be carried into a support from the article carry-in portion at the first position and an article can be carried into the article carry-out portion from a support at the second position with the rotation of the same supporting rotator, thus making it possible to improve the transport efficiency. The plurality of supports are supported by a pair of supporting rotators that are rotated about the single main shaft, and each of the supports can be rotated about a single subshaft. Therefore, the supports are less likely to rattle, and have good durability. An article transport apparatus can be thus achieved that has a simple apparatus configuration in terms of both structure and control, has good transport efficiency, and has good durability.

In an aspect, it is preferable that the number of the supports provided is at least three, an article handling portion is further provided at which handling of an article supported by the support located at a third position separate from the first position and the second position in the circumferential direction is performed, and the first position, the second position, and the third position correspond to positions at which the three supports are arranged when the supporting rotator is at a specific phase.

With this configuration, the operation of carrying an article into a support from the article carry-in portion at the first position, the operation of carrying an article into the article carry-out portion from a support at the second position, and the handling of an article at the third position can be performed in a temporally overlapping manner. Therefore, article handling efficiency in addition to transport efficiency can be improved. It should be noted that an example of the "handling of an article" is a "picking operation" of removing a required number of products from a container in which a plurality of products are stored, and in this case, picking efficiency can be improved.

In an aspect, it is preferable that the driving portion performs an intermittent action such that the rotation of the supporting rotator and a temporary suspension in the specific phase are repeated.

With this configuration, while the rotation of the supporting rotator is temporarily suspended at the specific phase, the operation of carrying an article into a support from the article carry-in portion at the first position, the operation of carrying an article into the article carry-out portion from a support at the second position, and the handling of an article at the third position can be performed appropriately.

In an aspect, it is preferable that the first position, the third position, and the second position are located in this order from an upstream side toward a downstream side in a rotational direction of the supporting rotator.

With this configuration, a cycle is favorably realized in which a support receives an article carried in from the article carry-in portion, the article is subjected to handling by rotating the supporting rotator, and the handled article is carried into the article carry-out portion from the support by further rotating the supporting rotator. Therefore, transport efficiency and article handling efficiency can be improved.

In an aspect, it is preferable that the support is constituted by a basket-like body in which one end is open and that includes a bottom portion having a comb-like shape, and a lateral wall portion that is provided standing upright on a portion of the bottom portion that couples ends of comb teeth on a side opposite to the open end, the article carry-in portion and the article carry-out portion are provided with a comb-like delivery portion at a position at which an article is delivered to/from the support, and comb teeth of the delivery portions of the article carry-in portion and the article carry-out portion are arranged at positions corresponding to a plurality of gaps between the comb teeth of the bottom portion of the support in an axial direction of the main shaft.

With this configuration, when the supporting rotator is rotated, the comb teeth of the bottom portion of the support do not interfere with the comb teeth of the delivery portions of the article carry-in portion and the article carry-out portion. Therefore, when the supporting rotator is rotated, an article can be automatically delivered between the support and the delivery portion of one of the article carry-in portion and the article carry-out portion depending on the rotational direction using the passing of the comb teeth. Accordingly, from this viewpoint as well, the structure of the apparatus can be simplified.

In an aspect, it is preferable that the article carry-in portion and the article carry-out portion are separately arranged in a vertical direction, and the delivery portion of one of the article carry-in portion and the article carry-out portion that is located on a lower side is configured to be capable of being tilted downward.

With this configuration, when the supporting rotator is rotated in a state in which an article is supported by the support, the delivery portion of one of the article carry-in portion and the article carry-out portion that is located on a lower side is tilted, thus making it possible to avoid the interference between the delivery portion and the article. Therefore, an article can be transported smoothly inside the transport apparatus. Moreover, the delivery portion on the lower side is tilted using a portion of a space that is originally present on the lower side of the apparatus, thus making it possible to suppress an increase in the overall size of the apparatus.

In an aspect, it is preferable that the attitude maintenance mechanism includes:

a fixed gear that is fixed to a non-rotating member for rotatably supporting the supporting rotator and is concentric with the main shaft;

a movable gear that is axially rotatably supported by the supporting rotator and is revolved together with the supporting rotator in a state of meshing with the fixed gear;

a driving member that is coupled to the movable gear to be axially rotated together with the movable gear;

driven members that are coupled to rotation shafts of the plurality of supports; and a drive transmission member that is wound around the driving member and the driven members.

With this configuration, when the supporting rotator is rotated in a certain direction, the plurality of supports can be rotated in a direction opposite to the rotational direction of the supporting rotator in conjunction with the rotation of the supporting rotator. The rotation of the supporting rotator is cancelled by the axial rotation of the supports in the opposite direction, thus making it possible to keep the supports in a constant attitude as viewed from the outside of the apparatus irrespective of the phase of the supporting rotator.

The article transport facility according to the present disclosure is favorably configured as follows.

The article transport facility according to the present disclosure is an article transport facility including:

two article transport apparatuses having any one of the above-described configurations, the article transport apparatuses being arranged side-by-side, wherein, in each of the article transport apparatuses, the attitude maintenance mechanism is provided on a side opposite to the other article transport apparatus in a direction in which the article transport apparatuses are lined up.

With this configuration, the two article transport apparatus can be arranged closely and compactly. Therefore, when two article transport apparatus are arranged side-by-side in the article transport facility, a space in which the facility is installed can be reduced.

It is sufficient that the article transport apparatus and the article transport facility according to the present disclosure can exhibit at least one of the above-described effects.

DESCRIPTION OF REFERENCE SIGNS

1 Article transport apparatus
20 Support
21 Basket-like body
22 Bottom portion
23 Comb tooth
24 Lateral wall portion
25 Rotation shaft
30 Supporting rotator
40 Base (non-rotating member)
50 Driving portion
60 Attitude maintenance mechanism
61 Fixed gear
62 Movable gear
63 Driving pulley (driving member)
64 Driven pulley (driven member)
67 Transmission belt (drive transmission member)
70 Article carry-in portion
72 Delivery conveyor (delivery portion)
80 Article carry-out portion
82 Receiving conveyor (delivery portion)
90 Article handling portion
100 Article transport facility
C Container (article)
Cs Storage container
Co Shipment container
P1 First position
P2 Second position
P3 Third position
A Main shaft

The invention claimed is:

1. An article transport apparatus comprising:
a plurality of supports for supporting an article;
a supporting rotator that can be rotated about a single main shaft and rotatably supports the supports at a plurality of positions located at an equal distance from the main shaft in a radial direction and arranged at equal intervals in a circumferential direction;
a driving portion for rotating the supporting rotator;
an attitude maintenance mechanism for keeping the plurality of supports in a constant attitude irrespective of a phase of the supporting rotator;
an article carry-in portion for carrying an article into the support located at a first position in the circumferential direction; and
an article carry-out portion for carrying an article out of the support located at a second position separate from the first position in the circumferential direction,
wherein the number of the supports provided is at least three,
wherein an article handling portion is further provided at which handling of an article supported by the support located at a third position separate from the first position and the second position in the circumferential direction is performed, and
wherein the first position, the second position, and the third position correspond to positions at which the three supports are arranged when the supporting rotator is at a specific phase.

2. The article transport apparatus according to claim 1, wherein the driving portion performs an intermittent action such that the rotation of the supporting rotator and a temporary suspension at the specific phase are repeated.

3. The article transport apparatus according to claim 1, wherein the first position, the third position, and the second position are located in this order from an upstream side toward a downstream side in a rotational direction of the supporting rotator.

4. The article transport apparatus according to claim 1, wherein:
the support is constituted by a basket-like body in which one end is open and that includes a bottom portion having a comb-like shape, and a lateral wall portion that is provided standing upright on a portion of the bottom portion that couples ends of comb teeth on a side opposite to the open end,
the article carry-in portion and the article carry-out portion are provided with a comb-like delivery portion at a position at which an article is delivered to/from the support, and
comb teeth of the delivery portions of the article carry-in portion and the article carry-out portion are arranged at positions corresponding to a plurality of gaps between the comb teeth of the bottom portion of the support in an axial direction of the main shaft.

5. The article transport apparatus according to claim 4, wherein the article carry-in portion and the article carry-out portion are separately arranged in a vertical direction, and
wherein the delivery portion of one of the article carry-in portion and the article carry-out portion that is located on a lower side is configured to be capable of being tilted downward.

6. The article transport apparatus according to claim 1, wherein the attitude maintenance mechanism includes:
a fixed gear that is fixed to a non-rotating member for rotatably supporting the supporting rotator and is concentric with the main shaft;
a movable gear that is axially rotatably supported by the supporting rotator and is revolved together with the supporting rotator in a state of meshing with the fixed gear;
a driving member that is coupled to the movable gear to be axially rotated together with the movable gear;
driven members that are coupled to rotation shafts of the plurality of supports; and
a drive transmission member that is wound around the driving member and the driven members.

7. An article transport facility comprising:
two article transport apparatuses according to claim 1, the article transport apparatuses being arranged side-by-side, and
wherein, in each of the article transport apparatuses, the attitude maintenance mechanism is provided on a side opposite to the other article transport apparatus in a direction in which the article transport apparatuses are lined up.

8. An article transport apparatus comprising:
a plurality of supports for supporting an article;
a supporting rotator that can be rotated about a single main shaft and rotatably supports the supports at a plurality of positions located at an equal distance from the main shaft in a radial direction and arranged at equal intervals in a circumferential direction;
a driving portion for rotating the supporting rotator;
an attitude maintenance mechanism for keeping the plurality of supports in a constant attitude irrespective of a phase of the supporting rotator;
an article carry-in portion for carrying an article into the support located at a first position in the circumferential direction; and
an article carry-out portion for carrying an article out of the support located at a second position separate from the first position in the circumferential direction,
wherein the attitude maintenance mechanism includes:
a fixed gear that is fixed to a non-rotating member for rotatably supporting the supporting rotator and is concentric with the main shaft;
a movable gear that is axially rotatably supported by the supporting rotator and is revolved together with the supporting rotator in a state of meshing with the fixed gear;
a driving member that is coupled to the movable gear to be axially rotated together with the movable gear;
driven members that are coupled to rotation shafts of the plurality of supports; and
a drive transmission member that is wound around the driving member and the driven members.

* * * * *